United States Patent
Park et al.

(10) Patent No.: US 11,372,623 B2
(45) Date of Patent: Jun. 28, 2022

(54) RANDOM NUMBER GENERATING DEVICE AND OPERATING METHOD OF THE SAME

(71) Applicant: ELECTRONICS AND TELECOMMUNICATIONS RESEARCH INSTITUTE, Daejeon (KR)

(72) Inventors: Kyung Hwan Park, Daejeon (KR); Seong Mo Park, Daejeon (KR); Byounggun Choi, Daejeon (KR); Sung Weon Kang, Daejeon (KR); Tae Wook Kang, Daejeon (KR); Jae-Jin Lee, Daejeon (KR); In Gi Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 62 days.

(21) Appl. No.: 16/843,466

(22) Filed: Apr. 8, 2020

(65) Prior Publication Data
US 2020/0326912 A1 Oct. 15, 2020

(30) Foreign Application Priority Data
Apr. 9, 2019 (KR) .................... 10-2019-0041650

(51) Int. Cl.
*G06F 7/58* (2006.01)

(52) U.S. Cl.
CPC .................... *G06F 7/588* (2013.01)

(58) Field of Classification Search
CPC ..... G06F 7/58–588; G06F 1/08; G06N 10/00; H01L 49/006
See application file for complete search history.

(56) References Cited

U.S. PATENT DOCUMENTS 6,542,014 B1 * 4/2003 Saito .................. G06F 7/588
327/164
6,745,217 B2 * 6/2004 Figotin .................. G06F 7/588
708/250

(Continued)

FOREIGN PATENT DOCUMENTS

JP H11161473 A 6/1999
JP 3501042 B2 2/2004
(Continued)

OTHER PUBLICATIONS

Nie et al. "Practical and fast quantum random number generation based on photon arrival time relative to external reference" on Appl. Phys. Lett. 104, 051110 (2014); https://doi.org/10.1063/1.4863224 (Year: 2014).*

Primary Examiner — Emily E Larocque
Assistant Examiner — Carlo Waje

(57) ABSTRACT

A random number generating device includes a particle detector, a pulse generator, a clock counter, and a random number converter. The particle detector detects particles emitted from a radioactive isotope. The pulse generator generates pulses corresponding to the particles. The clock counter counts the number of clock cycles during time intervals between the pulses and generates a plurality of count values. The random number converter adjusts a clock frequency, based on a minimum value and a maximum value of the plurality of count values and converts a target count value generated depending on the adjusted clock frequency into a random number.

20 Claims, 5 Drawing Sheets

(56) References Cited

U.S. PATENT DOCUMENTS

| | | | |
|---|---|---|---|
| 7,080,106 B2 * | 7/2006 | Ikeda | G06F 7/588 |
| | | | 708/250 |
| 7,747,665 B2 | 6/2010 | Liardet et al. | |
| 8,234,322 B2 * | 7/2012 | Saito | G06F 7/588 |
| | | | 708/250 |
| 9,535,661 B2 | 1/2017 | Cho et al. | |
| 9,710,231 B2 | 7/2017 | Youn et al. | |
| 9,841,949 B2 | 12/2017 | Park et al. | |
| 10,042,609 B2 | 8/2018 | Reulet | |
| 10,146,507 B2 | 12/2018 | Bohdan et al. | |
| 10,430,161 B1 * | 10/2019 | Tatarkiewicz | G01T 1/178 |
| 2003/0018674 A1 * | 1/2003 | Figotin | G06F 7/588 |
| | | | 708/250 |
| 2003/0050943 A1 * | 3/2003 | Ikeda | G06F 7/588 |
| | | | 708/3 |
| 2014/0129602 A1 | 5/2014 | Nam et al. | |
| 2020/0395947 A1 * | 12/2020 | Park | H03L 7/089 |

FOREIGN PATENT DOCUMENTS

| | | | | |
|---|---|---|---|---|
| KR | 20170007781 A | 1/2017 | | |
| KR | 101721176 B1 | 3/2017 | | |
| KR | 20180055299 A | 5/2018 | | |
| KR | 20180125755 A | 11/2018 | | |
| KR | 20180135562 A | 12/2018 | | |
| WO | WO-2014080272 A1 * | 5/2014 | | G06F 7/588 |

\* cited by examiner

RANDOM NUMBER GENERATING DEVICE AND OPERATING METHOD OF THE SAME

CROSS-REFERENCE TO RELATED APPLICATIONS

This U.S. non-provisional patent application claims priority under 35 U.S.C. § 119 of Korean Patent Application No. 10-2019-0041650, filed on Apr. 9, 2019, the entire contents of which are hereby incorporated by reference.

BACKGROUND

Embodiments of the inventive concept relate to a random number generating device and an operating method of the same, and more particularly, relate to a random number generating device and an operating method of the same using a radioactive isotope.

In a modern society exposed to variety of information, to prevent advanced hacking, etc., research of a field of information security to protect individuals, companies, institutions, etc. is actively underway. A random number is used for information security in various fields such as an e-commerce and a mobile authentication. A pseudo-random number is created by software algorithms, and these algorithms may cause regularity, tendency, or bias of the random number, and thus may be vulnerable to security. Accordingly, a true random number that is extracted from a hardware-based random phenomenon is spotlighted. For example, the true random number may be generated using naturally occurring noise, or quantum mechanical random phenomena.

Naturally occurring noise has a disadvantage of showing a certain tendency due to external interference or environmental influences such as temperature, humidity and pressure. On the other hand, quantum mechanical random phenomena may generate almost ideal random number regardless of environmental conditions. For example, the quantum mechanical random phenomena may be a random phenomenon of light or a natural decay phenomenon of radioactive isotopes. For example, the natural decay phenomenon of radioactive isotopes has randomness of decay events, no correlation with previous events, and independence of physical environmental conditions, and thus may be used as entropy for true random number.

In a modern society that requires various information processing and prompt and accurate information processing, the generation speed and quality of true random number are an important factor. Accordingly, what is needed is a device and method that has an improved speed of generating the random number. Furthermore, there is a need to improve the quality of the random number, such as decreasing bias and increasing randomness.

SUMMARY

Embodiments according to the inventive concept provide a random number generating device and an operating method of the same, which increase a speed of a random number generation and improve a quality of a generated random number.

A random number generating device according to an embodiment of the inventive concept includes a particle detector, a pulse generator, a clock counter, and a random number converter. The particle detector detects particles emitted from a radioactive isotope to generate a detection signal. The pulse generator generates pulses corresponding to the particles, based on the detection signal. The clock counter counts the number of clocks during time intervals between the pulses and generates a plurality of count values. The random number converter adjusts a clock frequency, based on a minimum value and a maximum value of the plurality of count values and converts a target count value generated depending on the adjusted clock frequency into a random number.

According to an embodiment, the random number converter may include a controller that generates a clock control signal and a bit conversion control signal, based on the minimum value, the maximum value, and the number of bits of the random number, a clock generator that outputs a clock signal having the adjusted clock frequency to the clock counter, based on the clock control signal, and a bit converter that converts the target count value into the random number, based on the bit conversion control signal.

According to an embodiment, the controller may include a reference value extractor that extracts the minimum value and the maximum value from the plurality of count values, a parameter calculator that generates a parameter corresponding to an adjustment ratio of the clock frequency, based on the minimum value, the maximum value, and the number of the bits, a conversion range controller that calculates a minimum value and a maximum value of the target count value that is included in the bit conversion control signal, based on the parameter, and a clock controller that generates the clock control signal, based on the parameter. According to an embodiment, the bit conversion control signal may include a correction minimum value that is the minimum value of the target count value, a correction maximum value that is the maximum value of the target count value, and the number of the bits, and the bit converter may generate random number bits by the number of the bits, based on a relative magnitude of the target count value with respect to the correction minimum value and the correction maximum value.

According to an embodiment, the random number converter may generate a parameter by dividing a count range that is defined by a difference between the maximum value and the minimum value by a maximum value of the random number, and may adjust the clock frequency, based on the parameter. According to an embodiment, the random number converter may calculate the maximum value of the random number by subtracting 1 from the total number of cases of random number values that are defined by the number of the bits of the random number. According to an embodiment, the random number converter may calculate a correction minimum value by dividing the parameter by the minimum value, may calculate a correction maximum value by dividing the parameter by the maximum value, and may generate the random number, based on a relative magnitude of the target count value with respect to the correction minimum value and the correction maximum value. A difference between the correction maximum value and the correction minimum value may be the maximum value of the random number. According to an embodiment, the random number converter may calculate the adjusted clock frequency by dividing the clock frequency by the parameter.

A random number generating device according to an embodiment of the inventive concept includes a particle detector, a pulse generator, a clock counter, and a random number converter. The particle detector detects particles emitted from a radioactive isotope during an initialization time to generate a first detection signal, and detects particles emitted from the radioactive isotope during a random number generation time to generate a second detection signal. The pulse generator generates a first pulse signal, based on the first detection signal, and generates a second pulse signal, based on the second detection signal. The clock counter generates first count values that depend on time intervals between pulses of the first pulse signal, based on a first clock signal, and generates second count values that depend on time intervals between pulses of the second pulse signal, based on a second clock signal. The random number converter calculates a clock frequency of the second clock signal, based on a minimum value and a maximum value of the first count values and the number of random number bits during the initialization time, and converts the second count values to a random number during the random number generation time.

According to an embodiment, the random number converter may include a controller that calculates a count range of the first count values, based on the minimum value and the maximum value, and adjusts the clock frequency such that the count range corresponds to the total number of cases of random number values based on the number of the random number bits. According to an embodiment, the random number converter may include a clock generator that generates the first clock signal that has an initial clock frequency during the initialization time and generates the second clock signal that has the calculated clock frequency during the random number generation time. According to an embodiment, the random number converter may include a bit converter that calculates random number values corresponding to each of the second count values during the random number generation time and converts each of the random number values into the random number bits to output the converted random number bits in parallel.

According to an embodiment, the random number converter, when the number of the random number bits is changed, may generate a third clock signal having a different clock frequency from the second clock signal, based on the changed number of the random number bits, and may convert third count values generated based on the third clock signal into the random number.

A method of operating a random number generating device according to an embodiment of the inventive concept includes generating initial count values corresponding to time intervals in which particles emitted from a radioactive isotope are detected, based on a initial clock frequency, extracting a minimum value and a maximum value from the initial count values, calculating a range of the initial count values, based on the minimum value and the maximum value, adjusting the initial clock frequency to a correction clock frequency, based on the range, generating a target count value, based on the correction clock frequency, and converting the target count value into a random number.

According to an embodiment, the generating of the initial count values may include detecting the particles to generate a detection signal, generating pulses corresponding to each of the particles, based on the detection signal, and counting the number of clocks having the initial clock frequency during time intervals between the pulses. According to an embodiment, the generating of the pulses may include amplifying the detection signal to generate an amplified signal, generating bell-shaped waveforms corresponding to peak values of the amplified signal, and processing the bell-shaped waveforms as square pulses.

According to an embodiment, the generating of the target count value may include, after generating of the initial count values, detecting first particle and second particle emitted from the radioactive isotope, generating a first pulse corresponding to the first particle and a second pulse corresponding to the second particle, and counting the number of clocks having the correction clock frequency during a time interval between the first pulse and the second pulse.

According to an embodiment, the adjusting of the initial clock frequency to the correction clock frequency may include calculating a parameter obtained by dividing the range of the initial count values by the maximum value of the random number, and calculating the correction clock frequency by dividing the initial clock frequency by the parameter. According to an embodiment, the converting of the target count value into the random number may include calculating a lower limit and an upper limit of the target count value, based on the number of bits of the random number and the range of the initial count values, and determining a random number value, based on a relative magnitude of the target count value, based on the lower limit or the upper limit of the target count value.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Hereinafter, embodiments of the inventive concept will be described clearly and in detail such that those skilled in the art may easily carry out the inventive concept.

Figure 1:
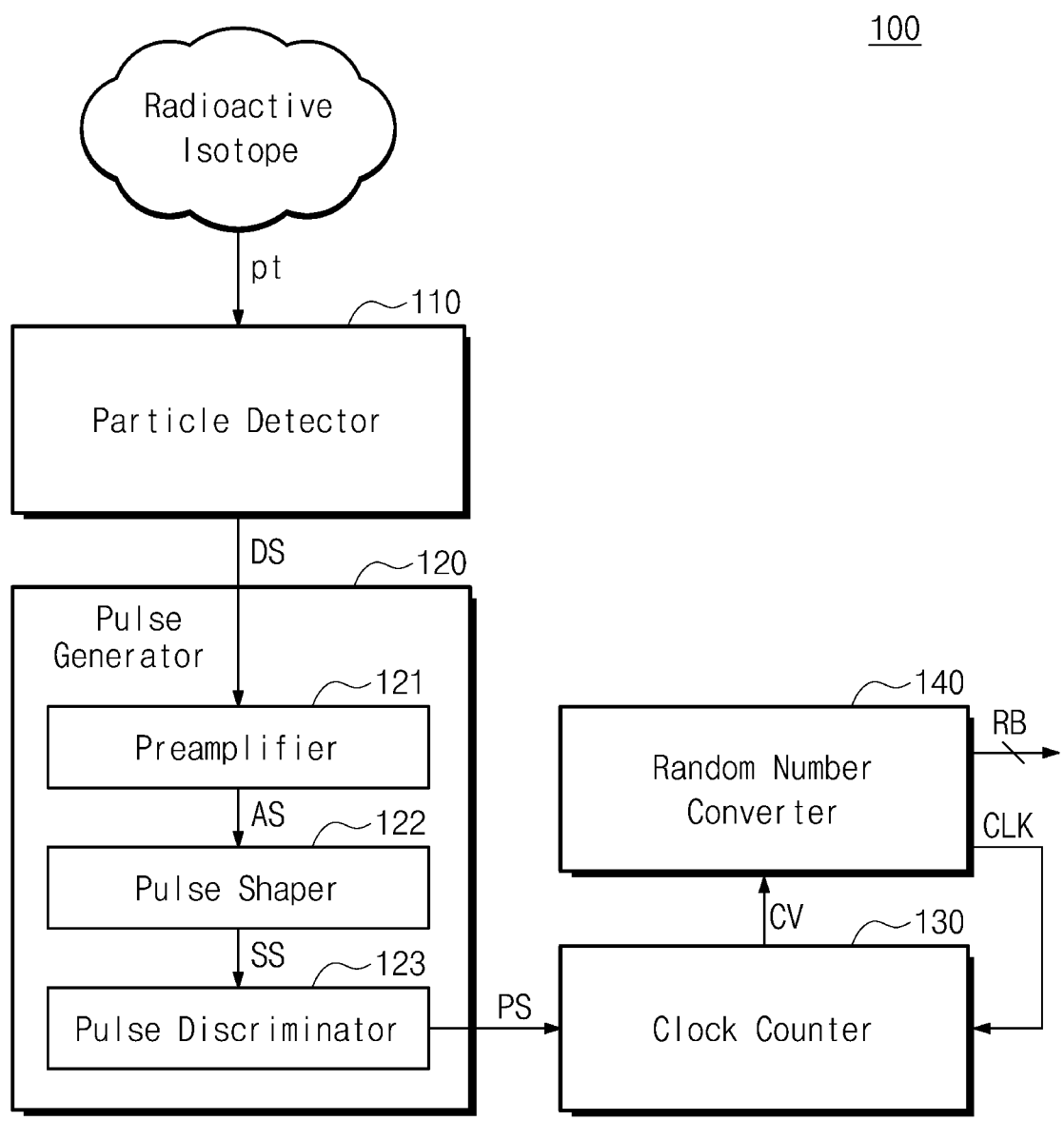
FIG. 1 is a diagram illustrating a random number generating device according to an embodiment of the inventive concept.

FIG. 1 is a diagram illustrating a random number generating device according to an embodiment of the inventive concept. Referring to FIG. 1, a random number generating device 100 includes a particle detector 110, a pulse generator 120, a clock counter 130, and a random number converter 140. The random number generating device 100 illustrated in FIG. 1 and other drawings will be understood as an example of a device that generates the random number using quantum mechanical random phenomena, and in particular, generates the random number by using a natural decay phenomenon of a radioactive isotope.

The radioactive isotope may mean an isotope that emits particles pt in a process of changing a combination of protons and neutrons of atomic nucleus from an unstable state to a stable state. The radioactive isotope, for stabilization, spontaneously emits particles pt with energy, such as a particles, which is defined as a natural decay phenomenon. The natural decay phenomenon of the radioactive isotope has randomness in decay events, no correlation to previous events, and irrelevance to physical environmental conditions. Therefore, the natural decay phenomenon of radioactive isotope may be used to generate a true random number.

Since the radioactive isotope has a specific half-life, an average particle radiation amount per unit time may be calculated based on the half-life. The average particle radiation amount may be more accurately calculated as the unit time is longer, and a deviation of the particle radiation amount may be increased as the unit time is shorter. The random number generating device 100 of FIG. 1 generates a random number by using time intervals of emitted particles pt to generate the random number regardless of the unit time.

The particle detector 110 detects particles pt emitted from the radioactive isotope. A manner in which the particle detector 110 detects particles pt is not limited. For example, the particle detector 110 may include a gas filled radiation detector, a semiconductor radiation detector, or a self-powered radiation detector, etc. The particle detector 110 may generate a detection signal DS, based on the detected particles pt. The detection signal DS is an electrical signal such as voltage or current, and is provided to the pulse generator 120. For example, a time at which the particles pt are detected and a time at which the particles pt are not detected may be distinguished from the detection signal DS.

The pulse generator 120 may generate a pulse signal PS, based on the detection signal DS. The pulse signal PS may include pulses respectively corresponding to the detected particles pt. That is, the number of pulses included in the pulse signal PS may correspond to the number of the detected particles pt. To generate the pulse signal PS, the pulse generator 120 may include a preamplifier 121, a pulse shaper 122, and a pulse discriminator 123.

The preamplifier 121 amplifies the detection signal DS to generate an amplification signal AS. The preamplifier 121 amplifies a magnitude of the detection signal DS such that a time when the particles pt are detected and a time when the particles pt are not detected may be easily distinguished. The amplification signal AS is provided to the pulse shaper 122.

The pulse shaper 122 shapes the amplification signal AS to generate a shaping signal SS. The pulse shaper 122 shapes the amplification signal AS such that a waveform corresponding to the particles pt has a specific shape. For example, the pulse shaper 122 may shape the amplification signal AS such that the waveform of the signal corresponding to the time at which the particles pt are detected has a bell shape. In addition, the pulse shaper 122 may remove a waveform (e.g., a tail waveform depending on a time constant of the preamplifier 121) of the signal corresponding to the time when the particles pt are not detected. As a result, the number of waveforms having the specific shape in the shaping signal SS may correspond to the number of particles pt detected.

The pulse discriminator 123 may generate the pulse signal PS, based on the shaping signal SS. The pulse discriminator 123 may generate pulses by discriminating waveforms having the specific shape (e.g., the bell shape) of the shaping signal SS. For example, the pulses may be square waveforms. The pulse discriminator 123 may generate the pulses respectively corresponding to the detected particles pt, and may provide the pulse signal PS including these pulses to the clock counter 130. Time intervals between the pulses may indicate time intervals between the detected particles pt. Therefore, as described above, the random number may be generated by using the time intervals of the emitted particles pt.

The clock counter 130 may measure the time intervals between pulses included in the pulse signal PS. When one pulse is input to the clock counter 130, the clock counter 130 may count the clocks included in the clock signal CLK for a time until a subsequent pulse is input. The clock counter 130 counts the number of clocks during a time interval between two adjacent pulses in the pulse signal PS. As the time interval increases, the number of clocks counted will increase, and the number of clocks counted depends on the time interval and clock frequency (e.g., clock speed). As a result of counting each of the time intervals between a plurality of pulses, the clock counter 130 may generate a plurality of count values CV.

The clock counter 130 may receive the clock signal CLK to count clocks. The clock signal CLK may be provided from the random number converter 140. As a frequency of the clock signal CLK is lower, that is, as the clock speed decreases, the number of clocks counted per the unit time decreases. That is, a range of random number that may be generated decreases. As the frequency of the clock signal CLK increases, that is, as the clock speed increases, the range (count) of the generated count values CV increases. The random number may be output as random bits, when the range of count values CV does not correlate with the number of bits of the random number, the calculation amount for generating the random number from the count values CV increases, and a quality of the random number may decrease. In addition, a time interval in which particles pt emitted from radioactive isotope are detected may have a specific range (upper and lower limits), and when such the range is not considered, the random number may be biased. The biasing means that when random numbers are generated, they may be biased to specific values.

The random number converter 140 converts the plurality of count values CV into a random number RB including random number bits. The random number RB includes the random number bits of a specific number of bits. The random number bits of the specific number of bits may be output in parallel. Therefore, the random number converter 140 may generate the random number RB at a high speed. When the number of the random number bits that may be generated with one count value increases, the speed of the random number RB generation increases. However, it may be necessary that the range of the count values CV has a correlation with the number of bits of the random number RB.

To this end, the random number converter 140 may adjust the clock frequency of the clock signal CLK during the initialization time before generating the random number RB such that the range of the count values CV corresponds to the number of bits of the random number RB. The random number converter 140 may monitor the count values CV received from the clock counter 130 during the initialization time. The random number converter 140 may extract a minimum value and a maximum value from the count values CV. The random number converter 140 may calculate a time range (count range) that is a difference between the maximum and minimum values. The random number converter 140 may adjust the clock frequency such that the number of clocks that may be counted in the calculated time range corresponds to the number of bits of the random number RB. For example, when the number of bits of the random number RB is 6 bits, the random number converter 140 adjusts the clock frequency of the clock signal CLK such that 63 ($2^6-1$) clocks may be output during the calculated time range. The detail operation of the random number converter 140 will be described later.

Figure 2:
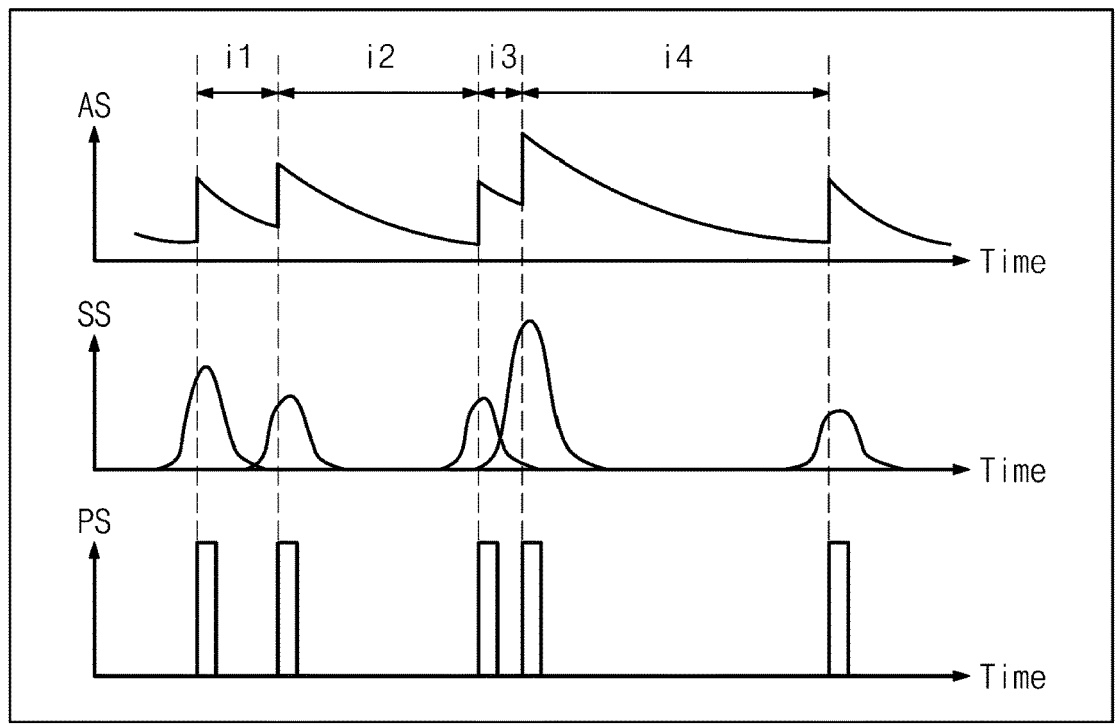
FIG. 2 is graphs illustrating exemplary waveforms of an amplification signal, a shaping signal, and a pulse signal according to an operation of a pulse generator of FIG. 1.

FIG. 2 is graphs illustrating exemplary waveforms of an amplification signal, a shaping signal, and a pulse signal according to an operation of a pulse generator of FIG. 1. Referring to FIG. 2, a horizontal axis represents a time, and vertical axes represent an amplitude (voltage or current level) of the amplification signal AS, the shaping signal SS, and the pulse signal PS, respectively. The amplification signal AS, the shaping signal SS, and the pulse signal PS corresponds to the amplification signal AS, the shaping signal SS, and the pulse signal PS of FIG. 1, respectively. For convenience of description, FIG. 2 will be described with reference to FIG. 1.

The amplification signal AS may be a signal amplified by the preamplifier 121 that amplifies the detection signal DS received from the particle detector 110. Since the amplification signal AS has five peak values, it will be understood as a waveform when five particles are detected from a radioactive isotope. Among the five peak values, there are four time intervals, i.e., first to fourth time intervals i1 to i4, between adjacent peak values. The first to fourth time intervals i1 to i4 are used to generate the random number, and a size of the random number depends on a length of each of the first to fourth time intervals i1 to i4.

The amplification signal AS may have a tail waveform depending on the time constant of the preamplifier 121 after the peak value. To increase the speed of random number generation of the random number generating device 100, a method of increasing a radiation amount of the particles pt of the radioactive isotope may be considered. When the radiation amount increases, the number of particles pt detected per unit time may increase. However, due to the circuit characteristics of the particle detector 110 or the pulse generator 120 (e.g., the preamplifier 121), it may be difficult to apply a method of increasing the speed of the random number generation by increasing the radiation amount. This may be explained with reference to the amplification signal AS.

For example, a dead time may exist when the particle detector 110 or the preamplifier 121 is operated. The dead time may mean a time during which a first particle is detected and a subsequent particle is not detected among the natural decay particles that are continuously generated. The dead time may depend on factors such as a time at which electrons or holes generated by the particles in the particle detector 110 move, a time to return to the stable state, and the tail waveform by the preamplifier 121. For example, when the detected time interval between particles is very short, the amplification signal AS is output as one peak value due to the tail waveform, etc. Accordingly, the inventive concept generates a plurality of random number bits at one time interval, using the clock counter 130 and the random number converter 140 of FIG. 1, instead of increasing the radiation amount. Therefore, the random number may be generated at high speed.

The shaping signal SS may be a signal that is obtained by shaping the amplification signal AS by the pulse shaper 122. The pulse shaper 122 may shape the amplification signal AS into a specific shape such as the bell shape. The pulse shaper 122 may detect peak values of the amplification signal AS and generate a bell-shaped waveform corresponding to each of the peak values. That is, five bell-shaped waveforms may be generated, based on the amplification signal AS having five peak values.

The pulse signal PS may be a signal obtained by the pulse discriminator 123 that processes waveforms of the shaping signal SS as square pulses. The pulse discriminator 123 may extract five maximum values from the shaping signal SS and generate pulses distributed to the first to fourth time intervals i1 to i4. Each of the five pulses corresponds to a time at which the particles pt were detected. These pulses are input to the clock counter 130. The clock counter 130 generates count values corresponding to each of the first to fourth time intervals i1 to i4.

Figure 3:
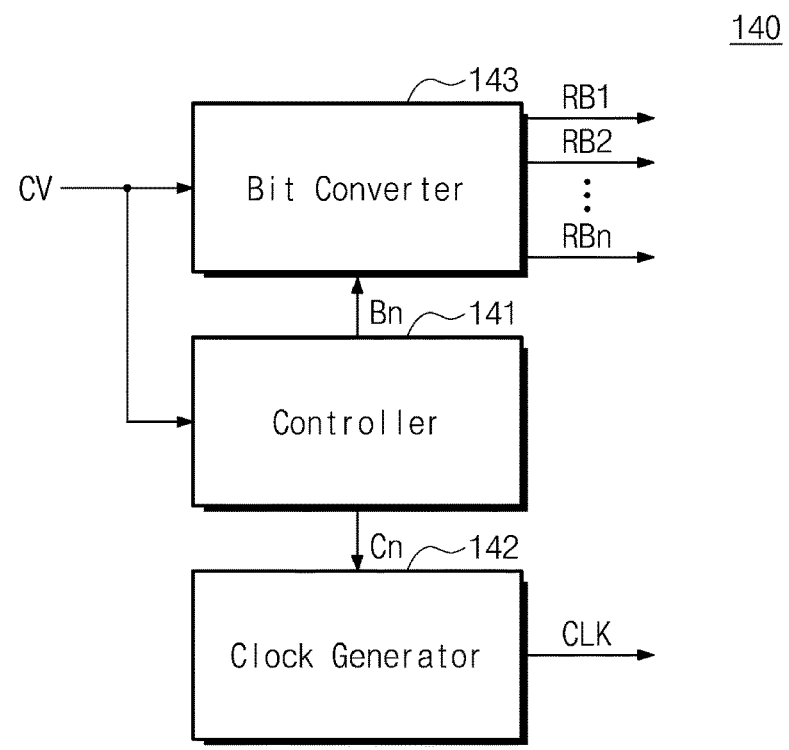
FIG. 3 is a block diagram illustrating a random number converter of FIG. 1.

FIG. 3 is a block diagram illustrating a random number converter of FIG. 1. The random number converter 140 of FIG. 3 will be understood as an exemplary configuration for determining an optimal clock frequency for random number generation and generating the random number based on the determined clock frequency. Referring to FIG. 3, the random number converter 140 may include a controller 141, a clock generator 142, and a bit converter 143.

Hereinafter, an initialization operation and a random number generation operation are defined. The initialization operation is defined as an operation for determining an optimal clock frequency for the random number generation by the random number converter 140 and proceeds during the initialization time. The initialization operation may be performed whenever a driving of the random number generating device 100 is started, but the inventive concept is not limited thereto. For example, the initialization operation may be performed at a specific time in consideration of the radiation amount of the particles pt in which the radioactive isotope change over time.

In addition, the random number generation operation is defined as an operation for generating random numbers, based on the clock frequency determined by the initialization operation, and proceeds during the random number generation time. The random number generation operation may be performed after the initialization operation.

In the initialization operation, the controller 141 receives the count values CV (initial count values) that is generated by particles emitted from the radioactive isotope. The count values CV are generated from the clock counter 130 of FIG. 1. The controller 141 may extract the maximum and minimum values of the count values CV received during the initialization time. The controller 141 may calculate a range of time interval of the particles pt that are detected from the particle detector 110 of FIG. 1 from a difference between the maximum value and the minimum value. The controller 141 may calculate the clock frequency such that a total number of cases of clocks provided within the range of the calculated time interval corresponds to a total number of cases of random number values depending on the number of bits of the random number. The detailed calculation process will be described below in FIG. 4.

The controller 141 generates a clock control signal Cn for adjusting the clock frequency of the clock signal CLK, based on these calculations. Also, the controller 141 may generate a conversion control signal Bn for controlling the random number generation of the bit converter 143. The conversion control signal Bn includes information for converting the count values CV generated based on the adjusted clock frequency into a random number. For example, the conversion control signal Bn may include lower and upper limits of the count value at the adjusted clock frequency and information of the number of bits of a random number.

The clock generator 142 generates the clock signal CLK, based on the clock control signal Cn. In the initialization operation, the clock generator 142 provides an initial clock signal having an arbitrary clock frequency (initial clock frequency) to the clock counter 130. The clock counter 130 of FIG. 1 generates the count values CV (initial count values), based on the initial clock frequency. The controller 141 provides the clock generator 142 with the clock control signal Cn for adjusting the clock frequency, based on the initial count values. During the random number generation operation, the clock generator 142 may generate the clock signal CLK of which clock frequency is adjusted based on the clock control signal Cn, and output the clock signal CLK to the clock counter 130 of FIG. 1.

In the random number generation operation, the bit converter 143 converts the count values CV into random numbers, based on the conversion control signal Bn. In this case, the count values CV will be understood as values generated (which may be referred to as target count values for random number generation), based on the clock signal CLK having a clock frequency adjusted by the clock control signal Cn. As described above, the conversion control signal Bn may include information of the lower limit (correction minimum value) and upper limit (correction maximum value) of count values at the adjusted clock frequency, and information of the number of bits of the random number. The number of integers from the correction minimum value to the correction maximum value may be equal to the number of random number values that may be generated.

The bit converter 143 may convert one count value (target count value) into random number bits RB1 to RBn. The random number includes the random number bits RB1 to RBn, and the number of bits of the random number may be "n". The bit converter 143 may generate the random number bits RB1 to RBn, based on a relative magnitude of the target count value with respect to the minimum correction value and the maximum correction value. For example, when the target count value is the minimum correction value, the bit converter 143 may output 00 . . . $0_2$. When the target count value is the maximum correction value, the bit converter 143 may output 11 . . . $1_2$. In addition, when the target count value is greater than the minimum correction value by 1, the bit converter 143 may output 00 . . . $1_2$.

Figure 4:
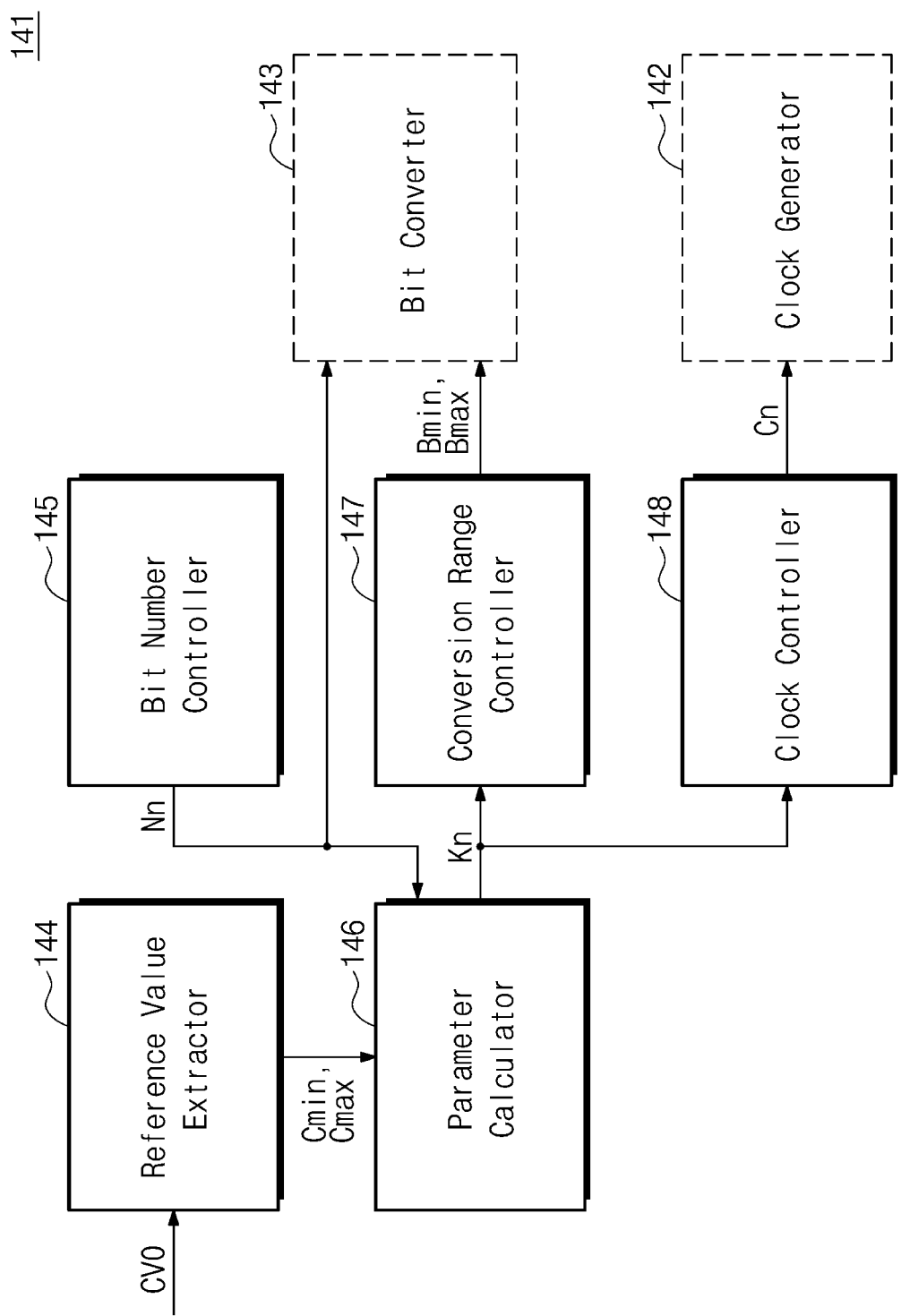
FIG. 4 is a block diagram illustrating a controller of FIG. 3.

FIG. 4 is a block diagram illustrating a controller of FIG. 3. The controller 141 of FIG. 4 will be understood as an exemplary configuration of calculating specific parameters for adjusting the clock frequency and generating random number bits as described in FIG. 3. Referring to FIG. 4, the controller 141 may include a reference value extractor 144, a bit number controller 145, a parameter calculator 146, a conversion range controller 147, and a clock controller 148.

The reference value extractor 144 receives initial count values CV0 from the clock counter 130 of FIG. 1. The initial count values CV0 are generated based on a clock signal having an arbitrary clock frequency (initial clock frequency) during the initialization time. The reference value extractor 144 extracts a minimum value Cmin and a maximum value Cmax among the initial count values CV0. The minimum value Cmin represents a minimum value of a time interval of two consecutive particles emitted from the radioactive isotope. The maximum value Cmax represents a maximum value of a time interval of two consecutive particles emitted from the radioactive isotope. For example, the reference value extractor 144 may store the initial count values CV0 and may extract the minimum value Cmin and the maximum value Cmax through comparison of the initial count values CV0.

The bit number controller 145 generates information of the number of bits Nn of the random number. The information of the number of bits Nn represents the number of bits of the random number when one count value is converted into a random number. The number of the bits of the random number may be fixed or variable in the random number generating device 100. Adjustment of the clock frequency described above or generation of random number bits is performed, based on the number of the bits of the random number. According to a user's request, the number of the random number bits to be generated may be changed, and the bit number controller 145 may generate the information of the number of bits Nn corresponding to the changed random number bits. In this case, the controller 141 may adjust the clock frequency of the clock signal again, based on the changed information of the number of bits Nn, and the bit converter 143 may convert the count values into random number bits of the changed number of bits.

The parameter calculator 146 may adjust the clock frequency, based on the minimum value Cmin, the maximum value Cmax, and the information of the number of bits Nn, and may generate a parameter Kn for generating the random number bits. In an example, the parameter Kn may be defined as an adjustment ratio of the clock frequency. The parameter Kn may indicate the ratio of the initial clock frequency to the adjusted clock frequency. The parameter calculator 146 may first calculate the count range that is defined by the minimum value Cmin and the maximum value Cmax. In this case, a count range M may be calculated as Cmax−Cmin, which is the difference between the maximum value Cmax and the minimum value Cmin. Thereafter, the parameter calculator 146 may calculate the parameter Kn by dividing the count range by the maximum value of the random number. In this case, the maximum value of the random number may be a number obtained by subtracting 1 from the number of possible values generated by the number of bits of the random number. That is, when the number of bits is n, the parameter Kn may be $M/(2^n-1)$.

The conversion range controller 147 calculates a correction minimum value Bmin and a correction maximum value Bmax, based on the parameter Kn. As the clock frequency of the clock signal changes based on the parameter Kn, the total number of count values (target count values) that may be generated changes. For example, when the clock frequency increases 2 times, the total number of target count values that may be generated may increase 2 times. The conversion range controller 147 may calculate the correction minimum value Bmin, which is a minimum value of the target count value depending on the adjustment of the clock frequency. The correction minimum value Bmin may be calculated as int (Cmin/Kn). The conversion range controller 147 may calculate the correction maximum value Bmax, which is a maximum value of the target count value depending on the adjustment of the clock frequency. The correction maximum value Bmax may be calculated as int (Cmax/Kn).

The clock controller 148 may calculate an optimized clock frequency under a condition of a current radioactive isotope, based on the parameter Kn. When the initial clock frequency is defined as R0 and the optimized clock frequency is defined as Rn, Rn=R0/Kn may be satisfied. For example, when the number of cases of the initial count values CV0 is greater than the number $2^n$ of the random number values, the clock controller 148 may decrease the number of cases of the count values to the number $2^n$ of the random number values by decreasing the clock frequency. For example, when the number of the initial count values CV0 is less than the number of the random number values, the clock controller 148 may increase the number of cases of the count values to the number of the random number values by increasing the clock frequency.

The clock controller 148 may provide the clock control signal Cn to the clock generator 142 such that the clock frequency is Rn. The clock generator 142 may generate a clock signal having a clock frequency of Rn, based on the clock control signal Cn. In this case, the clock counter 130 of FIG. 1 may generate the target count values for the random number generation, based on the clock signal, and the number of the target count values may be equal to the number $2^n$ of the random number values.

The bit converter 143 may convert each of the target count values to the random number, based on the conversion control signal Bn of FIG. 3. In this case, the conversion control signal Bn may include the information of the number of bits Nn, the correction minimum value Bmin, and the correction maximum value Bmax. For example, the bit converter 143 may determine the random number value depending on the relative magnitude of the target count value, based on the correction minimum value Bmin or the correction maximum value Bmax. The target count value has a value greater than or equal to the correction minimum value Bmin and less than or equal to the correction maximum value Bmax. The bit converter 143 may convert the determined random number value to a binary bit value and output the random number bits. Accordingly, the random numbers evenly distributed from 0 to $2^n$ may be generated without being biased.

For convenience of explanation, the above-described calculations may be described in Table 1. Here, it is assumed that the minimum value Cmin of the initial count values CV0 is 13 and the maximum value Cmax of the initial count values CV0 is 78, and the initial clock frequency is R0. In this case, the count range M is 65 which is 78-13. In addition, the parameter Kn depending on the number of bits, the clock frequency Rn, the correction minimum value Bmin, and the correction maximum value Bmax are calculated as follows.

TABLE 1

| The number of bits (n) | 4 | 5 | 6 | 7 | 8 |
|---|---|---|---|---|---|
| The number of random number values (bits) | 16 | 32 | 64 | 128 | 256 |
| parameter (Kn) | 4.333 | 2.097 | 1.032 | 0.512 | 0.255 |
| Clock frequency (Rn) | R0/4.333 | R0/2.097 | R0/1.032 | R0/0.512 | R0/0.255 |
| Correction minimum value (Bmin) | 3 | 6 | 12 | 25 | 51 |
| Correction maximum value (Bmax) | 18 | 37 | 75 | 152 | 306 |

Figure 5:
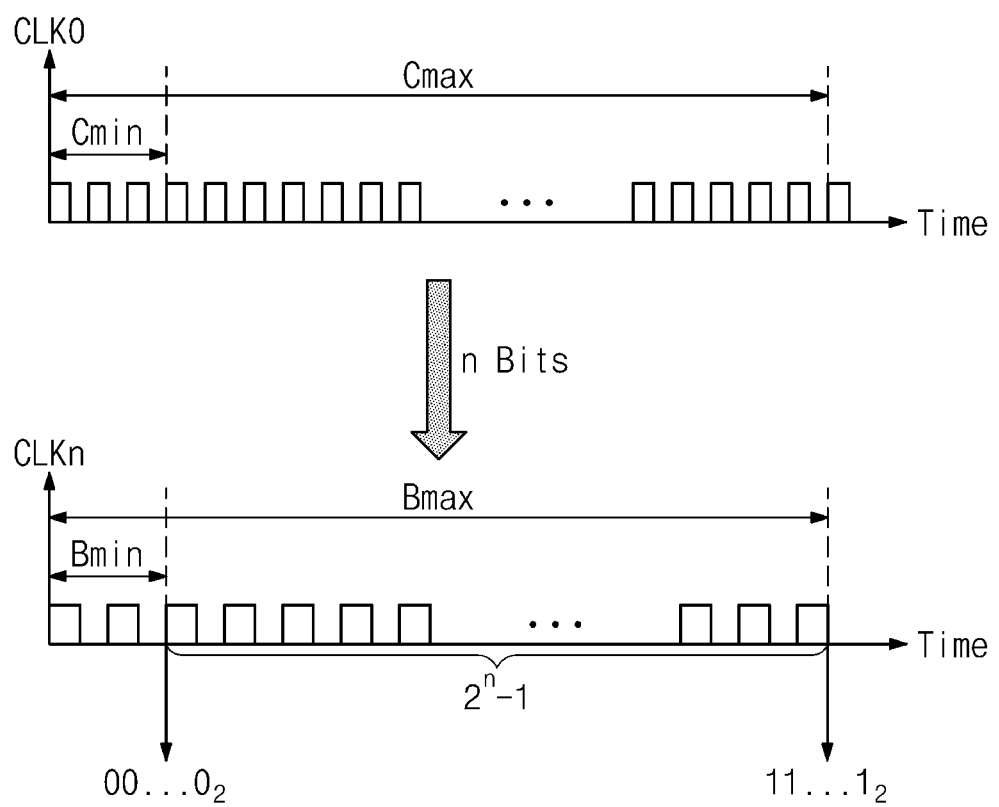
FIG. 5 is graphs describing an operation of adjusting a clock frequency using a random number converter of FIG. 3 and generating a random number.

FIG. 5 is graphs describing an operation of adjusting a clock frequency using a random number converter of FIG. 3 and generating a random number. Referring to FIG. 5, a horizontal axis represents a time, and the vertical axes represent the magnitude of the initial clock signal CLK0 and a correction clock signal CLKn with the clock frequency adjusted, respectively. For convenience of description, FIG. 5 will be described with reference to FIGS. 3 and 4.

The initial clock signal CLK0 has an initial clock frequency set arbitrarily. The clock counter 130 of FIG. 1 measures the time interval of pulses corresponding to particles pt emitted from radioactive isotope, based on the initial clock frequency. The clock counter 130 counts the number of clocks during the time interval between the pulses. The minimum value Cmin corresponding to the shortest time interval among the initial count values CV0 is extracted by the controller 141. The maximum value Cmax corresponding to the longest time interval among the initial count values CV0 is extracted by the controller 141. The controller 141 may calculate the parameter Kn by dividing a difference between the maximum value Cmax and the minimum value Cmin by $2^n-1$ (n is the number of bits of the random number), which is the maximum value of the random number.

The controller 141 may calculate the clock frequency of the correction clock signal CLKn by dividing the parameter Kn by the initial clock frequency. For example, the pulse width of the correction clock signal CLKn is illustrated differently from the pulse width of the initial clock signal CLK0, but the pulse widths may be the same with each other. The clock counter 130 may generate count values based on the correction clock signal CLKn. The minimum value of the count values is defined as the correction minimum value Bmin, and the maximum value is defined as the correction maximum value Bmax. Even in the same time interval in FIG. 5, the minimum value Cmin is a value counting three clocks, and the correction minimum value Bmin is a value counting two clocks.

The count value between the correction minimum value Bmin and the correction maximum value Bmax may be one of $2^n$ values from 0 to $2^n-1$. That is, when the random number is n bits, $2^n-1$ clocks may be provided to the clock counter 130 in a time range between the correction minimum value Bmin and the correction maximum value Bmax. For example, when the count value generated from the clock counter 130 is the correction minimum value Bmin, the random number may be $00 \ldots 0_2$. When the count value generated from the clock counter 130 is the correction maximum value Bmax, the random number may be $11 \ldots 1_2$. Accordingly, since one count value corresponds to one random value and an unbiased random value is generated, the quality of the random number may be improved. In addition, since a plurality of random number bits are generated with one count value, the generation speed of the random number may increase.

Figure 6:
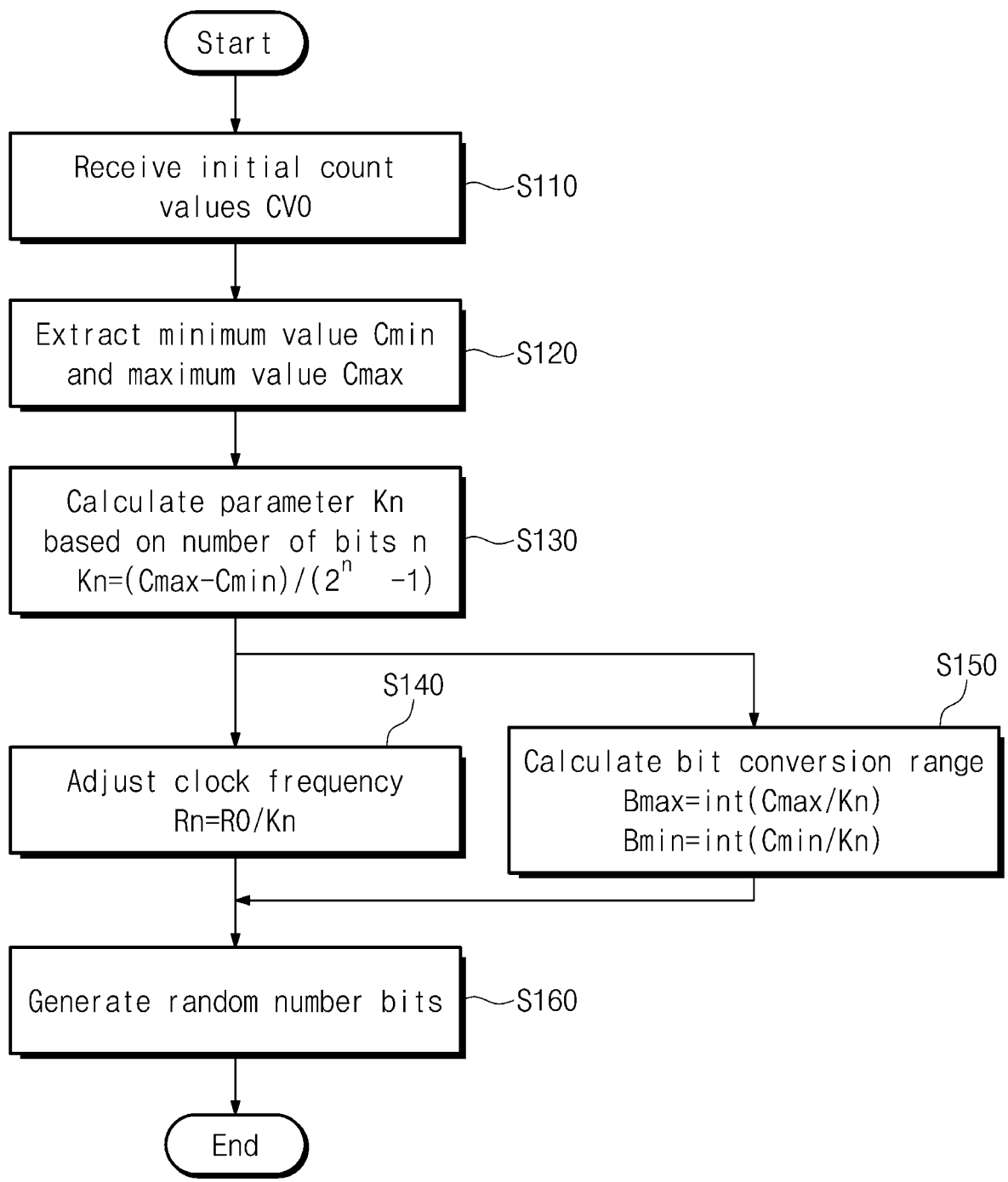
FIG. 6 is a flowchart describing a method of operating a random number generating device of FIG. 1.

FIG. 6 is a flowchart describing a method of operating a random number generating device of FIG. 1. Operations of FIG. 6 may be performed in the random number converter 140 described in FIGS. 1 to 5. For convenience of description, FIG. 6 will be described with reference to FIG. 4.

In operation S110, the random number converter 140 receives the initial count values CV0. To this end, the particle detector 110 of FIG. 1 detects the particles pt emitted from radioactive isotope to generate the detection signal DS. The pulse generator 120 of FIG. 1 generates the pulses corresponding to the detection time of each of the detected particles pt. The clock counter 130 counts the number of clocks of the initial clock signal CLK0 during time intervals between the pulses to generate initial count values CV0.

In operation S120, the random number converter 140 extracts the minimum value Cmin and the maximum value Cmax from the initial count values CV0. The minimum value Cmin and the maximum value Cmax may be extracted from the reference value extractor 144. The minimum value Cmin and the maximum value Cmax are provided to the parameter calculator 146.

In operation S130, the random number converter 140 calculates the parameter Kn, based on the minimum value Cmin, the maximum value Cmax, and the number of bits of the random number. The parameter Kn may be calculated in the parameter calculator 146. The parameter calculator 146 may calculate a difference (count range) between the maximum value Cmax and the minimum value Cmin. The count range M may be calculated as Cmax-Cmin. The parameter calculator 146 may calculate the parameter Kn by dividing the count range by $2^n-1$, which is the maximum value of the random number.

In operation S140, the random number converter 140 may adjust the frequency of the initial clock signal CLK0, based on the parameter Kn. The clock frequency may be adjusted through the clock controller 148. When the initial clock frequency is R0, the correction clock frequency Rn for random number generation may be calculated as R0/Kn. The clock generator 142 may generate a clock signal having the correction clock frequency Rn.

In operation S150, the random number converter 140 calculates a bit conversion range. The bit conversion range is defined by the correction minimum value Bmin and the correction maximum value Bmax. The correction minimum value Bmin and the correction maximum value Bmax may mean a minimum value and a maximum value of count values that may be generated by the clock counter 130, based on the correction clock frequency Rn. The correction minimum value Bmin and the correction maximum value Bmax may be calculated by the conversion range controller 147. The correction minimum value Bmin may be calculated as int (Cmin/Kn). The correction maximum value Bmax may be calculated as int (Cmax/Kn).

In operation S160, the random number converter 140 may convert the count value (target count value) generated based on the correction clock frequency Rn into the random number. The random number may include n-bit random numbers. The random number bits may be generated by the bit converter 143. The bit converter 143 may convert the count values to the random number, based on the conversion control signal Bn that includes the information of the number of bits Nn, the correction minimum value Bmin, and the correction maximum value Bmax.

According to an embodiment of the inventive concept, a random number generating device and method of operating the same generate random number bits by using time intervals between pulses generated by particles emitted from a radioactive isotope, thereby increasing the speed of random number generation.

In addition, a random number generating device and method of operating the same according to an embodiment of the inventive concept adjust a clock frequency by using time intervals between pulses, thereby reducing a bias of a random number and improving a quality of a random number.

The contents described above are specific embodiments for implementing the inventive concept. The inventive concept may include not only the embodiments described above but also embodiments in which a design is simply or easily capable of being changed. In addition, the inventive concept may also include technologies easily changed to be implemented using embodiments. Therefore, the scope of the inventive concept is not limited to the described embodiments but should be defined by the claims and their equivalents.

What is claimed is:

1. A random number generating device comprising:
a particle detector configured to detect particles emitted from a radioactive isotope to generate a detection signal;
a pulse generator configured to generate pulses corresponding to the particles, based on the detection signal;
a clock counter configured to count the number of clock cycles during time intervals between the pulses and to generate a plurality of count values; and
a random number converter configured to adjust a clock frequency, based on a minimum value and a maximum value of the plurality of count values, and to convert a target count value generated depending on the adjusted clock frequency into a random number.

2. The random number generating device of claim 1, wherein the random number converter includes:
a controller configured to generate a clock control signal and a bit conversion control signal, based on the minimum value, the maximum value, and a number of bits of the random number;
a clock generator configured to output a clock signal having the adjusted clock frequency to the clock counter, based on the clock control signal; and
a bit converter configured to convert the target count value into the random number, based on the bit conversion control signal.

3. The random number generating device of claim 2, wherein the controller includes:
a reference value extractor configured to extract the minimum value and the maximum value from the plurality of count values;
a parameter calculator configured to generate a parameter corresponding to an adjustment ratio of the clock frequency, based on the minimum value, the maximum value, and the number of bits of the random number;
a conversion range controller configured to calculate a minimum value and a maximum value of the target count value that is included in the bit conversion control signal, based on the parameter; and
a clock controller configured to generate the clock control signal, based on the parameter.

4. The random number generating device of claim 2, wherein the bit conversion control signal includes a correction minimum value that is the minimum value of the target count value, a correction maximum value that is the maximum value of the target count value, and the number of bits of the random number, and
wherein the bit converter generates random number bits by the number of bits of the random number, based on a relative magnitude of the target count value with respect to the correction minimum value and the correction maximum value.

5. The random number generating device of claim 1, wherein the random number converter is further configured to generate a parameter by dividing a count range that is defined by a difference between the maximum value and the minimum value by a maximum value of the random number, and to adjust the clock frequency based on the parameter.

6. The random number generating device of claim 5, wherein the random number converter is further configured to calculate the maximum value of the random number by subtracting 1 from the total number of cases of random number values that are defined by a number of bits of the random number.

7. The random number generating device of claim 5, wherein the random number converter is further configured to:
calculate a correction minimum value by dividing the minimum value by the parameter;
calculate a correction maximum value by dividing the maximum value by the parameter; and
generate the random number, based on a relative magnitude of the target count value with respect to the correction minimum value and the correction maximum value.

8. The random number generating device of claim 7, wherein a difference between the correction maximum value and the correction minimum value is the maximum value of the random number.

9. The random number generating device of claim 5, wherein the random number converter is further configured to calculate the adjusted clock frequency by dividing the clock frequency by the parameter.

10. A random number generating device comprising:
a particle detector configured to detect particles emitted from a radioactive isotope during an initialization time to generate a first detection signal, and to detect particles emitted from the radioactive isotope during a random number generation time to generate a second detection signal;
a pulse generator configured to generate a first pulse signal, based on the first detection signal, and to generate a second pulse signal, based on the second detection signal;
a clock counter configured to generate first count values that depend on time intervals between pulses of the first pulse signal, based on a first clock signal, and to generate second count values that depend on time intervals between pulses of the second pulse signal, based on a second clock signal; and
a random number converter configured to calculate a clock frequency of the second clock signal, based on a minimum value and a maximum value of the first count values and a number of random number bits during the initialization time, and to convert the second count values to a random number during the random number generation time.

11. The random number generating device of claim 10, wherein the random number converter includes a controller configured to calculate a count range of the first count values, based on the minimum value and the maximum value, and to adjust the clock frequency such that the count range corresponds to the total number of cases of random number values based on the number of the random number bits.

12. The random number generating device of claim 10, wherein the random number converter includes a clock generator configured to generate the first clock signal that has an initial clock frequency during the initialization time, and to generate the second clock signal that has the calculated clock frequency during the random number generation time.

13. The random number generating device of claim 10, wherein the random number converter includes a bit converter configured to calculate random number values corresponding to each of the second count values during the random number generation time, and to convert each of the random number values into the random number bits to output the converted random number bits in parallel.

14. The random number generating device of claim 10, wherein the random number converter is further configured to:
in response to a request to change the number of random number bits, generate a third clock signal having a different clock frequency from the second clock signal based on the changed number of random number bits, and
convert third count values generated based on the third clock signal into the random number.

15. A method of operating a random number generating device, the method comprising:
generating initial count values corresponding to time intervals in which particles emitted from a radioactive isotope are detected, based on an initial clock frequency;
extracting a minimum value and a maximum value from the initial count values;
calculating a range of the initial count values, based on the minimum value and the maximum value;
adjusting the initial clock frequency to a correction clock frequency, based on the range;
generating a target count value, based on the correction clock frequency; and
converting the target count value into a random number.

16. The method of claim 15, wherein the generating of the initial count values includes:
detecting the particles to generate a detection signal;
generating pulses corresponding to each of the particles, based on the detection signal; and
counting the number of clock cycles having the initial clock frequency during time intervals between the pulses.

17. The method of claim 16, wherein the generating of the pulses includes:
amplifying the detection signal to generate an amplified signal;
generating bell-shaped waveforms corresponding to peak values of the amplified signal; and
processing the bell-shaped waveforms as square pulses.

18. The method of claim 15, wherein the generating of the target count value includes:
after generating of the initial count values, detecting first particle and second particle emitted from the radioactive isotope;
generating a first pulse corresponding to the first particle and a second pulse corresponding to the second particle; and
counting the number of clock cycles having the correction clock frequency during a time interval between the first pulse and the second pulse.

19. The method of claim 15, wherein the adjusting of the initial clock frequency to the correction clock frequency includes:
calculating a parameter obtained by dividing the range of the initial count values by the maximum value of the random number; and
calculating the correction clock frequency by dividing the initial clock frequency by the parameter.

20. The method of claim 15, wherein the converting of the target count value into the random number includes:
calculating a lower limit and an upper limit of the target count value, based on a number of bits of random number and the range of the initial count values; and
determining a random number value, based on a relative magnitude of the target count value, based on the lower limit or the upper limit of the target count value.

* * * * *